No. 772,400. PATENTED OCT. 18, 1904.
O. S. BRAGSTAD & J. L. LA COUR.
ELECTRICAL MACHINE.
APPLICATION FILED JUNE 13, 1902.
NO MODEL. 2 SHEETS—SHEET 1.

Witnesses:

Inventors:
Ole Sivert Bragstad
Jens Lassen la Cour

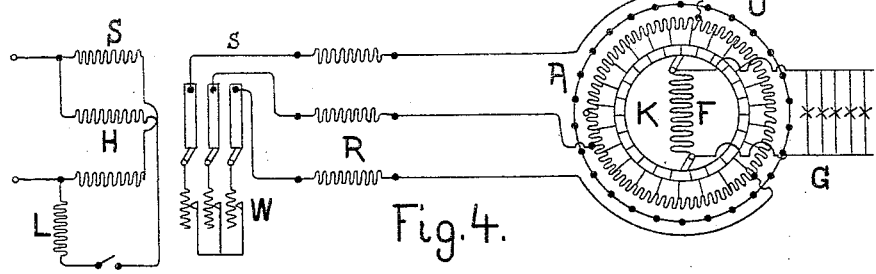
Fig. 4.
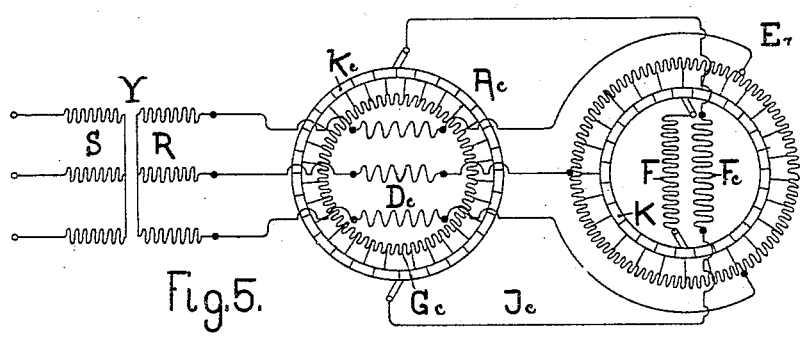
Fig. 5.
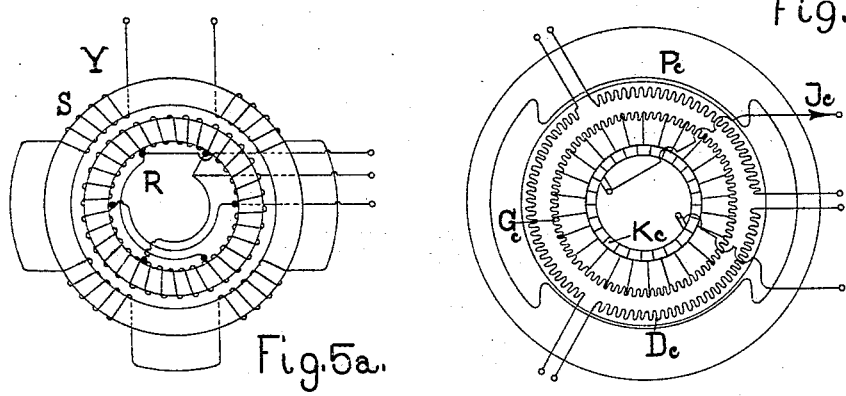
Fig. 6.
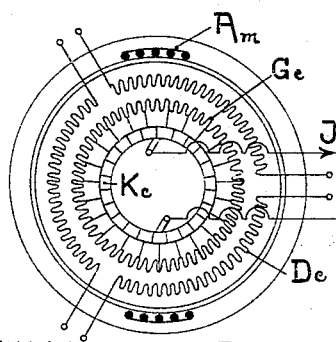
Fig. 5a.
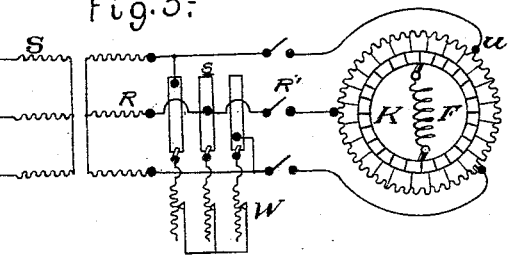
Fig. 7.
Fig. 3b.

No. 772,400.
Patented October 18, 1904.

UNITED STATES PATENT OFFICE.

OLE SIVERT BRAGSTAD AND JENS LASSEN LA COUR, OF KARLSRUHE, GERMANY.

ELECTRICAL MACHINE.

SPECIFICATION forming part of Letters Patent No. 772,400, dated October 18, 1904.

Application filed June 13, 1902. Serial No. 111,565. (No model.)

*To all whom it may concern:*

Be it known that we, OLE SIVERT BRAGSTAD, electrical engineer, a citizen of the Kingdom of Norway, and JENS LASSEN LA COUR, electrical engineer, a citizen of the Kingdom of Denmark, both residing at Lachnerstrasse 14, in the city of Karlsruhe, Grand Duchy of Baden, Germany, have invented a new and useful Motor-Generator, of which the following is a specification.

For converting alternating into continuous currents and the reverse the following three methods only, in general, come into consideration: first, rotary converter in connection with a stationary transformer; second, synchronous motor coupled with a continuous-current machine, and, third, asynchronous motor coupled with a continuous-current machine. The first of these methods has the disadvantage that it is difficult to start a rotary converter with alternating current, special starting devices being necessary. Further, a sparkless commutation of the continuous current with large frequency can only be effected by enlarging the dimensions of the converter. With the second arrangement where a synchronous motor drives the continuous-current machine usually also a special starting contrivance is necessary to start the combination with alternating current, and, as well, both machines must be constructed for the whole power of the total combination. The third arrangement with asychronous motor and continuous-current machine has in addition to this latter disadvantage the disadvantage that the alternating current is displaced in phase with respect to the terminal voltage.

By the employment of the alternating-current machine hereinafter described as converter will, first, be effected an easy starting with the alternating current; secondly, coincidence of phase in the alternating-current circuit, and, thirdly, a saving of material relatively to the three methods of converting given above. This alternating-current machine consists of an ordinary asynchronous motor and a rotary converter, both set on the same shaft. The secondary winding of the asynchronous motor and the armature-winding of the rotary converter are series connected.

Figure 1:
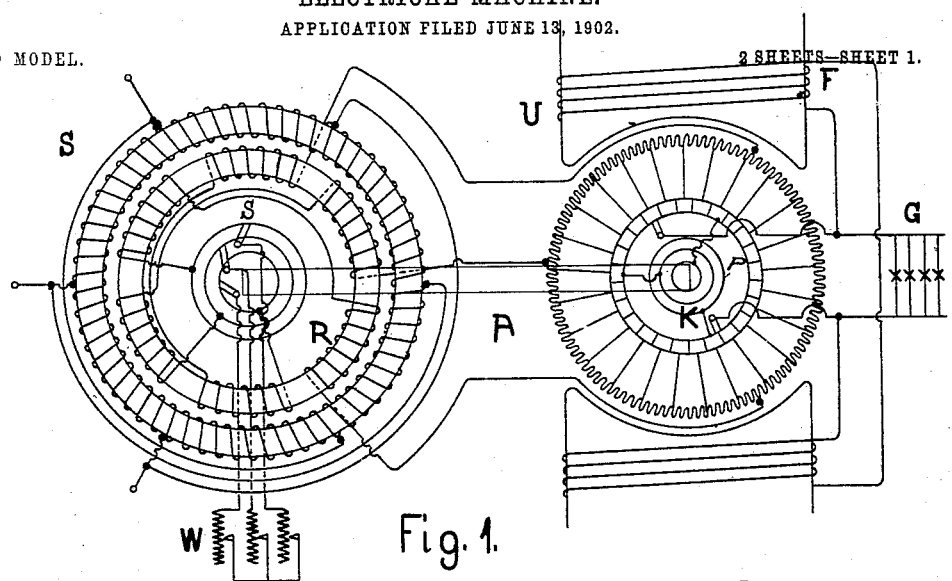
Figure 2:
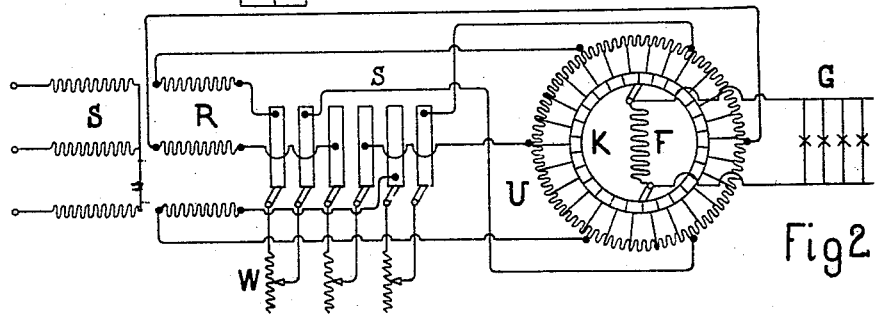

In the accompanying drawings, Figure 1 shows the diagram of connections of such a three-phase continuous-current converter. S is the primary winding, supposed to be on the stator of the three-phase motor, which serves to take the primary three-phase current led in. The phases of this winding are in the figure ring-connected, but can be equally well star-connected. R is the secondary winding of the motor, which is connected in series with the armature-winding of the rotary converter V. K is the collector; F, the field-winding, which is shunted to the continuous-current load G of the converter. W denotes the three-phase starting resistance, which, by means of the collector-rings $s$, is connected with the secondary winding of the three-phase motor. For the sake of simplicity it may be assumed that the motor and converter both have the same number of poles and that the rotor and converter armature, which are set on the same shaft, rotate with a speed which corresponds to half the frequency of the primary current. The rotary field generated by the primary current will, relatively to the rotor, rotate with a velocity which also corresponds to half the frequency, and therefore induce in the rotor-winding an electromotive force of half the frequency of the primary current. This electromotive force drives a current in the armature-winding of the converter, whereby in the same a rotary field occurs which rotates, relatively to the shaft, with a velocity corresponding to the number of revolutions. If the armature-winding of the converter is so connected with the rotor-winding that the rotary field rotates in an opposite direction to the shaft, such field remains motionless, wherefrom it follows that the machine with this number of revolutions operates as a sychronous motor. As the asynchronous motor rotates with a number of revolutions corresponding with half the frequency, so only half of the electric energy led in into the asynchronous motor will be converted into mechanical energy and transmitted, by means of the shaft, to the converter, while the second half of the energy led in is transmitted to the rotor-winding, and thereby led in into the converter in the form of electric energy. Thus the asynchronous motor operates half as motor and half as transformer. The converter operates half as continuous-current generator and half as converter. As the dimensions of the asynchronous motor depend upon the primary frequency and not on the number of revolutions of the rotor, so the same will be theoretically half as large as if with the given number of revolutions it converted the whole of the energy led in into mechanical energy. The converter works with a number of revolutions equaling half the primary, which is more advantageous in relation to sparking and on this account can be proportioned smaller than an ordinary continuous-current machine or an ordinary converter. Should the asynchronous motor and the converter not possess the same number of poles, then the machine would rotate with a velocity proportioned to the primary frequency as the number of poles of the motor to the sum of the number of poles of rotor and converter. From this it follows that the energies converted in the motor into mechanical and electric power are proportional to the number of poles of the motor and of the converter. Thus we are enabled to construct the continuous-current machine with the most advantageous number of poles, and thus effect a considerable saving in material. We have seen above that with synchronism of the combined machines both the rotary fields of the asynchronous motor—the one caused by the stator-current, the other caused by the rotor-current—rotate in relation to space with the same velocity and that in relation to space as well the exciting-field as the armature-field of the converter remains stationary. It is besides known that the reciprocal position of such opposed fields depends on the load of the machine and that the fields can only be brought out of synchronism by external force. Such requisite external force is often termed the "synchronizing" force of the machine. Should an external disturbance occur with the machine described, it causes not only a reciprocal displacement of the fields in the converter, but as well a displacement of those of the asynchronous motor. Thus with such a combination there is also present a synchronizing force which may be even greater than with ordinary transformers, where the armature-field does not come fully into activity. What pertains to the starting of this machine is exceedingly simple. For starting, the resistance W, Fig. 1, is employed and is gradually thrown out of circuit, whereby the number of revolutions gradually increases, and if caused to gradually approach the synchronous beat with a proper excitation of the converter synchronism follows. From this onward the machine runs asynchronously and the resistance W is short-circuited. In Fig. 2 a similar device is represented, but having the modification that the transformer is six phase, which makes a starting contrivance with six collector-rings requisite.

Figure 3:
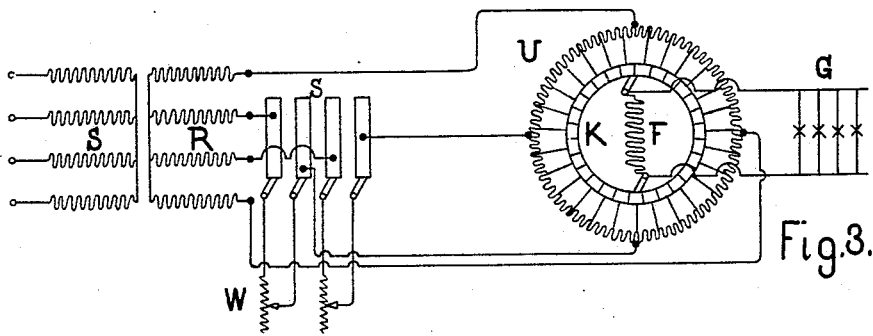
Figure 3A:
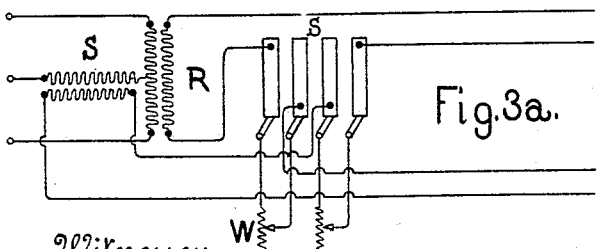

Fig. 3 shows a converter combination for two or four phase plants in which motor as well as converter is constructed four phase. Besides it may be observed that the number of phases of the rotor is independent of the number of phases of the stator, so that as well the number of phases of the converter is independent of the number of phases of the primary circuit. Since a two-phase rotor with respect to a three-phase stator, or inversely, possesses greater cross-flux, the circuit connection shown in Fig. $3^a$ can be employed. According to this the asynchronous motor is used partly as motor and partly as Scott transformer, while the primary three-phase current is tranformed into a secondary two-phase system.

Fig. $3^b$ illustrates a starting device wherein switches R' are inserted into the leads between the two rotor-windings to permit the insertion and removal of starting resistances W, which are placed between slip-rings S, connected to one of the rotor-windings. At starting, the switches remain open and the resistances are introduced, while upon attaining synchronism the switches are closed and the resistances are thereupon opened at W.

The device described cannot only be used for the converting of polyphase currents, but also for the converting of single-phase currents into continuous currents, as shown in Fig. 4. In this figure, S represents the working phase and H the auxiliary phase of the single-phase asynchronous motor. As assumed in the figure, a self-induction L or a condenser can be inserted in series. The poles of the rotating converter U are furnished with a Hutin-Leblanc damper (German Patent No. 76,814) to reduce the pulsations of the rotary field generated by the rotor-current. The synchronous working of such a combination is considerably better with single-phase current than that of an ordinary converter, as with such a combination the converter is polyphase and the pulsations of the instantaneous power arising from the single-phase current come into activity almost solely with the asynchronous machine where they are least injurious. It may be further remarked that with the converter combination described a high primary voltage can at first be transformed in the asynchronous machine, to be converted afterward. A special transformer is thereby rendered unnecessary. The ratio between the alternating and continuous-current voltage is the same as with ordinary converters. The compounding of such a converter can with this combination be effected in a still simpler manner than is usual, because the choking-coils, which for such object are ordinarily connected in series with the converter, are here rendered unnecessary, as the asynchronous motor possesses a reactance which can be suitably allowed for when the calculation for the combination is made. Such a combination can be also employed as a frequency-transformer by taking the current of different frequency away from the rotor by means of slip-rings. The converter may in this case be an alternating-current generator with its field excited from another source. These slip-rings are illustrated in Fig. 1 and are designated by the reference-letter P. From the existence of the synchronizing force described above it follows that the combination can also be used as a generator and that such use of the same is precisely analogous to that of an ordinary synchronous generator. The presence of the synchronizing force of such a combination arises from the mechanical coupling of the two machines, which prevents the machines from working against each other, as otherwise would be the case. (See Bradley, United States Patent No. 438,602, October 21, 1890.)

A compounding for the combination as generator or motor can be obtained in the following way: With a three-phase winding $D^c$ wound on the armature $A^c$ of a rectifier $G^c$, coupled with the combination, the rotor R of the principal generator Y, Fig. 5, is connected in series. The armature $A^c$ rotates with the same speed as that of this rotary field generated by the rotor-current in the winding $D^c$, but in the reverse direction, so that this rotary field with constant phase displacement stands still. This rotary field with phase displacement is displaced to a certain angle in the direction of rotation or against such direction of rotation of the armature $A^c$, according as the displacement of the current is lag or lead. A continuous-current winding $G^c$ is also wound in the same armature $A^c$ which leads to the commutator $K^c$. From this commutator a continuous current $T^c$ is taken and led into a compound winding $F^c$, wound on the field-magnet of the double-current generator $E^r$. This generator $E^r$ feeds the rotor-circuit of the main generator Y with a three-phase current of small frequency and delivers a direct current for the excitation of its own field. The said generator $E^r$ serves thus to excite the main generator, and thereby deliver to the rotor-circuit of the same electrical power, which corresponds with the number of poles of the double-current generator. It is therefore proportional to that current with which the stator-circuit of the main generator feeds the external circuit. As with a given phase displacement of the load the direct current $Y^c$ becomes proportional to that three-phase current which the double-current generator $E^r$ delivers, so will compounding of the main generator follow. The motionless fixed poles belonging to the armature $A^c$ can be arranged as shown in Fig. 6 and do not need excitation. If the pole $P^c$ be so placed that with equality of phase of the current it has a displacement in relation to the armature-field in the direction of rotation of the armature $A^c$, the right position for the brushes will be in the neutral zone, which insures a sparkless commutation. Thus with lag of current a strengthening of the field is obtained and a greater electromotive force is induced in the continuous-current winding, while with lead of phase a weakening of the field and a diminishing of the induced electromotive force will be obtained. Through this a compounding for any desired phase displacement is attained. The field of the armature $A^c$ can also, as shown in Fig. 7, be constructed without material poles. In this case to compound on different phase displacements the brushes are placed somewhat out of the neutral zone, displaced with respect to the rotation of the armature, so that a lag of phase of the current increases the electromotive force induced in the winding $G^c$ and a lead of phase of the current diminishes the same and even can reverse the direction of the electromotive force. The electromotive force induced in the continuous winding $G^c$ for excitation of the compound winding of the exciter is ordinarily so small that even with an arrangement of field having no material poles the brushes will not spark. If because of unfavorable circumstances sparking should occur, such may be obviated by fixing on the field at the spot where the brushes stand a special commutating device or a Hutin-Leblanc damper $A^m$. The device for compounding described can without change be used as a principal generator Y, Fig. 5$^a$, for single-phase current. The exciting-current can therewith be taken either single or poly phase. In Fig. 5$^a$, R is the three-phase rotor-winding. In general the armature $A^c$ is fixed on the common shaft of the motor-generator Y and the exciter $E^r$. The armature $A^c$ then must have the same number of poles as the exciter $E^r$, so that the rotary field of the armature-windings $D^c$ stands still. Altogether three machines are obtained thus if the combined machines work as compounded generator. The primary winding of the main generator, the winding $D^c$ of the armature $A^c$, and the secondary winding of the exciter are all connected in series; but the order of this connection is a matter of indifference. It is equally possible to have some of these three windings rotating while the rest stand still. This, however, makes it requisite to take off the current by means of collector-rings, with brushes to the windings which stand still, and complicates the matter.

What we claim as our invention, and desire to secure by Letters Patent, is—

1. The combination of an asynchronous machine with a rotary converter, which are mechanically coupled in any suitable way and in which the phases of the rotor of the asynchronous machine are connected, through the armature of a rectifier, in concatenation with equidistant points of the armature-winding of the rotary converter, for the purpose of converting single-phase or polyphase alternating current into continuous current or into alternating current of other frequency and number of phases or for generating alternating currents; which for the purpose of compounding is so modified that the field of the rotary converter is provided with an ordinary compound winding the terminals of which are impressed with a continuous-current voltage derived from the commutator of the rectifier connected between the asynchronous machine and the converter, all substantially as set forth.

2. Combined alternating and continuous current machine having two mechanically-connected rotor-windings revolving in fields energized respectively by alternating and continuous currents, said rotor-windings being connected in parallel and supplying current to a direct-current circuit through a commutator and brushes carried by one of said machines, substantially as described.

3. A combined alternating and continuous current machine having two mechanically-connected rotor-windings revolving in fields energized respectively by alternating and continuous currents, said rotor-windings being connected in parallel and supplying current to a direct-current circuit through a commutator and brushes carried by one of said machines, and means for starting either from the alternating or from the continuous current side, substantially as set forth.

4. A combined alternating and continuous current machine having two mechanically-connected rotor-windings revolving in fields energized respectively by alternating and continuous currents, said rotor-windings being connected in parallel and supplying current to a direct-current circuit through a commutator and brushes carried by one of said machines, slip-rings and brushes in leads connecting said rotor-windings whereby regulating resistances may be inserted at starting, and means for short-circuiting said resistances, substantially as described.

5. A combined alternating and continuous current machine having two mechanically-connected rotor-windings revolving in fields energized respectively by alternating and continuous currents, said rotor-windings being connected in parallel and supplying current to a direct-current circuit through a commutator and brushes carried by one of said machines, and means for inserting adjustable resistances intermediate the rotor-windings, substantially as set forth.

6. A combined alternating and continuous current machine having two mechanically-connected rotor-windings revolving in fields energized respectively by alternating and continuous currents, said rotor-windings being connected in parallel at corresponding points by conductors having switches therein, and supplying current to a direct-current circuit through a commutator and brushes carried by one of said machines, one of said windings being connected with slip-rings, permitting the insertion of starting resistances until proper speed is attained and allowing the removal of said resistances upon closing the switches of the connecting-conductors of the windings.

7. A combined alternating and continuous current machine having two mechanically-connected rotor-windings revolving in fields energized respectively by an alternating supply-current of certain frequency and a continuous current, said rotor-windings being connected in parallel and supplying currents to a direct-current circuit through a commutator and brushes carried by one of said machines and to an alternating-current circuit through slip-rings, whereby an alternating current of a different frequency from that supplied and a continuous current may be taken from the machine.

8. An alternating-current machine having two mechanically-connected rotor-windings revolving in fields energized respectively by an alternating supply-current of certain frequency and a continuous current, said rotor-windings being connected in parallel and supplying current to an alternating-current circuit through slip-rings mounted on one of said machines whereby an alternating current of different frequency from that supplied may be taken from the machine, substantially as described.

9. A combined alternating and continuous current machine having two mechanically-connected rotor-windings connected in parallel through a rectifier and supplying current to a direct-current circuit through a commutator and brushes carried by one of said machines, the rotor-windings revolving in fields energized respectively by an alternating and by two continuous currents one of the continuous currents being taken from the commutator of the rectifier and the other being derived from the continuous-current circuit, substantially as described.

In testimony whereof we have signed our names to this specification in the presence of two subscribing witnesses.

OLE SIVERT BRAGSTAD.
  JENS LASSEN LA COUR.

Witnesses:
 H. W. HARRIS,
 JACOB ADRIAN.